US006157796A

United States Patent [19]

Fujiwara

[11] Patent Number: 6,157,796

[45] Date of Patent: Dec. 5, 2000

[54] DEVELOPER CONTAINER, PROCESS CARTRIDGE, DEVELOPER SEALING MEMBER AND DEVELOPER CONTAINER SEALING METHOD

[75] Inventor: Yasuo Fujiwara, Kashiwa, Japan

[73] Assignee: Canon Kabushiki Kaisha, Tokyo, Japan

[21] Appl. No.: 09/267,361

[22] Filed: Mar. 15, 1999

[30] Foreign Application Priority Data

Mar. 20, 1998 [JP] Japan .................................. 10-090649

[51] Int. Cl.[7] .............................. B29D 7/01; B65B 51/10; B65D 17/00; G03G 15/08; G09F 3/04

[52] U.S. Cl. ................ 399/106; 220/359.3; 222/DIG. 1; 399/111; 428/35.7

[58] Field of Search ..................................... 399/102, 103, 399/105, 106, 119, 120, 111; 220/359.1, 359.2, 359.3, 361, 359; 222/DIG. 1; 428/411.1, 35.7; 156/308.4

[56] References Cited

U.S. PATENT DOCUMENTS

| | | | |
|---|---|---|---|
| 5,591,468 | 1/1997 | Stockley, III et al. | 220/359 X |
| 5,689,772 | 11/1997 | Fujiwara et al. | 399/106 |
| 5,749,026 | 5/1998 | Goldie | 399/103 |
| 5,752,131 | 5/1998 | Fujiwara et al. | 399/106 |
| 5,794,101 | 8/1998 | Watanabe et al. | 399/103 |
| 5,909,606 | 6/1999 | Fujiwara | 399/106 |

FOREIGN PATENT DOCUMENTS

| | | |
|---|---|---|
| 1-223485 | 9/1989 | Japan . |
| 3-39763 | 2/1991 | Japan . |
| 4-353435 | 12/1992 | Japan . |
| 4-359274 | 12/1992 | Japan . |
| 7-056428 | 3/1995 | Japan . |

*Primary Examiner*—Sophia S. Chen
*Attorney, Agent, or Firm*—Fitzpatrick, Cella, Harper & Scinto

[57] ABSTRACT

The present invention provides a developer container having excellent sealability. In the developer container for containing a developer with an opening sealed, the sealant main component of the sealing member is a low-molecular-weight polyolefin polymer synthesized by using a metallocene catalyst, and a material compatible with the dispersed material dispersedly contained in the sealant layer of the sealing member is dispersedly contained in at least the sealing area of the container.

25 Claims, 13 Drawing Sheets

DEVELOPER CONTAINER, PROCESS CARTRIDGE, DEVELOPER SEALING MEMBER AND DEVELOPER CONTAINER SEALING METHOD

BACKGROUND OF THE INVENTION

1. Field of the Invention

The present invention relates to a developer container used for supplying a developer to a development device of an image forming apparatus such as an electrostatic copying machine, a printer, and the like; a process cartridge; and a developer sealing member used for the developer container.

2. Description of the Related Art

An electrophotographic recording apparatus is conventionally used for a printer, a copying machine, and the like.

In such an electrophotographic recording apparatus, a developer is used in a development device and consumed with proceeding of an image formation process, and thus the developer must be opportunely supplied to the development device. Although a developer container is used for supplying the developer, the developer container is also used as a developer container for supplying a developer to a copying machine or the like at a time, and a developer container for a process cartridge used in a printer of a terminal device of information apparatus such as a computer, a facsimile, CAD, or the like.

As material for the developer container, high-impact polystyrene (HIPS), acrylonitrile-butadiene-styrene copolymers (ABS), and the like can be used. As a sealing member for sealing an opening, an easy peel film comprising a sealant layer of an ethylene-vinyl acetate copolymer (EVA), a tear sealing member comprising a cover film and a tear tape, and the like are used.

A sealing method for the sealing member comprises sealing the sealing member to the surface of an opening flange of the developer container by heat sealing or impact sealing.

However, the use of a conventional developer container has the following problems:

(1) Pressure sealability (referred to as "sealability" hereinafter) of a seal has been increasingly required for distribution with a recent increase in size of the developer container. In addition, the number of grades of materials such as HIPS, ABS, and the like, which are used for the developer container, has been increased. Particularly, the number of grades with low sealability which contain a large amount of a seal inhibitor such as metal stearate or the like contained in a flame retardant or releasing agent, as in UL flame-retardant V2 grade HIPS, has been increased. There is thus demand for a seal with high adhesion which can be applied to these grades.

(2) Conventional sealant material EVA has a molecular structure in which a non-polar crystallizable methylene unit and an uncrystallizable vinyl acetate unit with high polarity are randomly copolymerized in its molecule. The sealability can be significantly improved by increasing the sealant content in the uncrystallizable vinyl acetate component. However, the sealant becomes sticky, and causes the problem of blocking (pseudo adhesion between films) in an original seal at high temperature and high humidity. This also causes a problem in that when a process cartridge is allowed to stand in the same environment of high temperature and high humidity, unsealing strength is significantly increased due to blocking between the sealant surface of a seal held between the container and a development frame and an end seal, thereby deteriorating operationality.

(3) EVA is produced by radical reaction of ethylene and vinyl acetate used as raw materials using a titanium catalyst (Ziegler catalyst) at a reaction temperature of about 200° C. and a high pressure of 1500 atom or more. However, the Ziegler catalyst is a multi-site catalyst having many active points, and thus polyethylene comonomer cannot be uniformly polymerized with production a low-density component (sticky component) of low-molecular-weight polyethylene as a by-product. This results in the problem of easily causing the blocking phenomenon in the original seal and process cartridge.

SUMMARY OF THE INVENTION

Accordingly, it is an object of the present invention to provide a developer container with satisfactory sealability and a sealing method therefor, which can be applied to a large developer container and a developer container using a material having low sealability.

Another object of the present invention is to provide a developer container and a sealing method therefor in which the blocking phenomenon is suppressed in an original seal and a process cartridge, and sealing workability and operationality of the process cartridge are stable and satisfactory.

A further object of the present invention is to provide a process cartridge comprising a developer container in which the above-described problems are resolved.

In order to achieve the objects, the present invention provides a developer container for containing a developer with an opening sealed, the container comprising a sealing member, wherein the sealant main component of the sealing member is a low-molecular-weight polyolefin polymer synthesized by using a metallocene catalyst, and a material compatible with a dispersed material dispersedly contained in a sealant layer of the sealing member is dispersedly contained in at least a seal area of the container.

The present invention also provides a process cartridge detachable from the body of an image forming apparatus, comprising at least an image holding member and the above-mentioned developer container.

The present invention further provides a sealing method for a developer container for containing a developer, the method comprising sealing an opening of the container with a sealing member, wherein the sealant main component of the sealing member is a low-molecular-weight polyolefin polymer synthesized by using a metallocene catalyst, a material compatible with a dispersed material dispersedly contained in a sealant layer of the sealing member is dispersedly contained in at least a seal area of the container, and the sealing member is bonded to the seal receiving surface of the container without direct contact with the seal receiving surface.

The present invention further provides a developer sealing member provided at an opening of a developer container containing a developer, wherein the sealant main component of the sealing member is a low-molecular-weight polyolefin polymer synthesized by using a metallocene catalyst, and a thermoplastic elastomer is dispersedly contained in the sealant layer of the sealing member.

The developer container of the present invention has the property that the dispersed material dispersedly contained in the sealant layer of the sealing member is compatible with the material dispersedly contained in the seal area of the container, and thus both materials are dissolved in each other in the seal interface by the heat and pressure applied during heat sealing to produce bonding force. The bonding force is added to adhesive force between the sealant layer and the seal surface of the container, thereby causing good sealability without deteriorating easy peeling.

The sealing member of the present invention has the effect of suppressing blocking for the reason below.

The metallocene catalyst has uniform active points (single site), and enables the formation of a polymer having a narrow molecular weight distribution and composition distribution (i.e., a uniform comonomer distribution), which cannot be obtained by the Ziegler catalyst. Particularly, the metallocene catalyst has high activity to polyolefins such as polyethylene and the like.

Since the sealant component of the sealing member of the present invention comprises a low-molecular-weight polyolefin polymer synthesized by the metallocene catalyst, it is possible to securely remove excessive vinyl acetate component and low-density component of low-molecular weight polyethylene during polymerization, which are causes (sticky components) of blocking of a conventional EVA sealant.

Therefore, with respect to the sealing workability, a sealing work can be stably carried out without an abrupt increase in film tension due to blocking between the films delivered from an original seal.

Even after storage of the process cartridge in an environment of high temperature and high humidity, no blocking occurs between the sealant layer of the sealing member and the end seal, thereby achieving stable operationality.

The developer container of the present invention has the property that the dispersed material dispersedly contained in the sealant layer of the sealing member is compatible with the material dispersedly contained in the seal area of the container, and thus both materials are dissolved in each other in the seal interface by the heat and pressure applied during heat sealing to produce bonding force. The bonding force is added to adhesive force between the sealant layer and the seal surface of the container, thereby causing good sealability without deteriorating easy peeling.

Since the sealant component of the toner seal comprises a low-molecular-weight polyolefin polymer synthesized by the metallocene catalyst, it is possible to securely remove excessive vinyl acetate component and low-density component of low-molecular weight polyethylene during polymerization, which are causes (sticky components) of blocking of a conventional EVA sealant. Therefore, a sealing work can be stably carried out without an abrupt increase in film tension due to blocking between the films delivered from an original seal. Furthermore, even after storage of the process cartridge in an environment of high temperature and high humidity, no blocking occurs between the sealant layer of the sealing member and the end seal, thereby achieving stable operationality.

In the description below, the developer container is referred to as a "toner container". The toner container means a container for containing toner particles in the case of a one-component developer, and a container for containing toner particles and, if required, carrier particles, in the case of a two-component developer.

Further objects, features and advantages of the present invention will become apparent from the following description of the preferred embodiments with reference to the attached drawings.

DESCRIPTION OF THE PREFERRED EMBODIMENT

Figure 1:
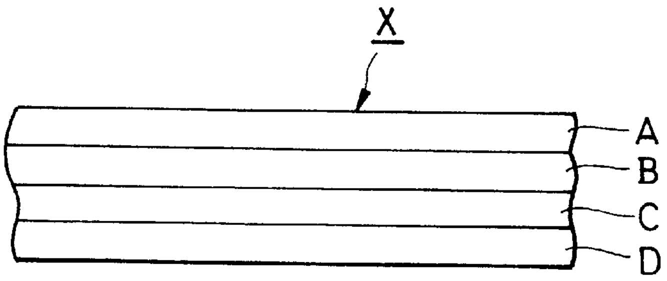
FIG. 1 is a sectional view showing an example of the construction of a developer seal of the present invention.

A developer sealing member of the present invention generally comprises a substrate and a sealant layer formed thereon. As the substrate, various films such as a polyester film, a polypropylene film, a polyamide film, a polyimide film, a polyethylene film, and the like can be used.

As the material dispersedly contained in the sealant layer, a thermoplastic elastomer (referred to as "TPE" hereinafter) is preferred.

TPE can be processed like plastics, and has rubber elasticity at room temperature. As the rubber elasticity, a reversible elongation at room temperature is preferably 50% or more, particularly 100% or more.

TPE preferably contains a flexible component (soft segment) having rubber elasticity in its molecule, and a molecule restricting component (hard segment) for preventing plastic deformation corresponding to crosslinking points of vulcanized rubber, and giving a reinforcement effect.

By dispersedly mixing such TPE in the sealant layer, it is possible to improve the dynamic viscoelasticity of the entire sealant layer in environments of a wide range of temperatures. As a result, an instantaneous impact on a seal during distribution less causes peeling of the seal because of the improved elasticity of the sealant layer, thereby causing excellent impact resistance at low temperatures, and imparting sufficient sealability to a large toner container, UL standard flame-retardant V2 material with low sealability, and the like.

In respect to the ratios of the soft segment and hard segment, TPE preferably contains 10 to 80 parts by weight of soft segment on the basis of 100 parts by weight of a total of both segments.

Particularly, TPE containing polybutadiene as the soft segment is preferably used.

Examples of such TPE include styrene-butadiene-styrene block copolymers, styrene-ethylene-butadiene-styrene block copolymers, and syndiotactic 1,2-polybutadiene.

The content of the dispersed material in the sealant layer is preferably 0.5 to 30 wt %.

In addition, the material having the same chemical structure as the soft segment of the TPE is preferably dispersedly contained as a compatible material in the seal area of the toner container.

As the toner container, various plastic molded containers are used. Particularly, the toner container preferably contains a butadiene material in at least the seal area, and is formed by molding a resin selected from high impact polystyrene (HIPS), acrylonitrile-butadiene-styrene copolymers (ABS), and polycarbonate-acrylonitrile-butadiene-styrene copolymers (PC-ABS).

As a binder for the sealant layer of the present invention, a low-molecular-weight polyolefin polymer synthesized by using a metallocene catalyst is used.

As the metallocene catalyst, zirconocene dichloride is used as a main catalyst, and methyl aluminoxane is used as a cocatalyst. A catalyst having a single active point is preferably used, and particularly the metallocene catalyst has high activity to polyolefins such as polyethylene and the like.

As the low-molecular-weight polyolefin polymer, linear low-density polyethylene or copolymer thereof is preferably used. Preferred copolymerization monomers include octene, propylene, and the like.

The linear low-density polyethylene can be produced by copolymerization of ethylene as a main monomer and several mol % of a-olefin monomer (comonomer), and a copolymer thereof is produced by further copolymerizing octene, propylene, or the like.

As the method of producing the linear low-density polyethylene or copolymer thereof, a medium-pressure vapor phase or liquid phase method under a pressure of about 100 atm or less is used.

The thus-obtained linear low-density polyethylene or copolymer thereof preferably contains 50 to 99% by weight of linear low-density polyethylene component based on the total amount of the sealant. The use of the metallocene catalyst enables the low-molecular weight polyolefin polymer to have a narrow molecular weight distribution in gel permeation chromatography (GPC). The polymer preferably has a molecular weight dispersion (Mw/Mn) in the range of 1 to 3, more preferably in the range of 2 to 3.

The GPC molecular weight distribution preferably has no low-molecular weight component in a molecular weight range of $1\times10^3$ or less, and a peak in the molecular weight region of $1\times10^4$ to $1\times10^6$, more preferably a peak in the molecular weight region of $1\times10^4$ to $1\times10^5$.

As described above, the linear low-density polyethylene having no low-molecular weight component and a narrow molecular weight distribution with a peak on the high-molecular weight side thereof is used as the binder for the sealant layer of the present invention.

FIG. 1 is a sectional view of a developer seal X in accordance with an embodiment of the present invention. The developer seal X shown in FIG. 1 has a multilayered structure comprising a first substrate A, a second substrate B, a cushion layer C and a sealant layer D.

As the first substrate A, a biaxially oriented polyester film, a uniaxially oriented polypropylene film, an oriented polyamide film, or the like, which has a thickness of about 10 to 30 μm, is used. Since hygroscopicity of a film causes curling of the seal X, and deteriorates the workability of heat sealing, the biaxially oriented polyester film or uniaxially oriented polypropylene film is preferably used. From the viewpoint of film strength, the biaxially oriented polyester film is most preferably used.

As the second substrate B, an oriented polyamide layer having a thickness of about 10 to 30 μm, or a biaxially oriented polyester film having the same thickness is preferably used for imparting tensile strength (high toughness) to the seal X.

In order to correctly indicate the unsealing direction of the toner container, an arrow or the like may be printed on the second substrate B.

Further, without the need to print an arrow or the like, either of the first substrate A and the second substrate B may be omitted.

As the cushion layer C, a polyethylene layer having a thickness of about 10 to 30 μm is used, and particularly a polyethylene layer having a molecular weight of as low as about 10,000 is preferably used for increasing the cushion effect in heat sealing.

As the sealant layer D, the above-described linear low-density polyethylene having no low-molecular weight component and a narrow molecular weight distribution having a peak on the high-molecular weight side thereof can be used as a base.

As various additives for the sealant layer, an antioxidant, a lubricant, and the like can be appropriately used.

The sealant layer D preferably has a thickness of about 30 to 50 μm, more preferably about 40 to 50 μm, in consideration of a balance between sealability and unsealing strength.

The seal X is produced by the method comprising laminating the first substrate A and the second substrate B, bonding (dry laminating) both substrates A and B and the sealant layer C by using the melted cushion layer D or bonding the sealant layer D to the other three layers by extrusion lamination after the three layers are completed, cooling the layers and then taking up the layers.

As material for the toner container, HIPS, ABS, PC-ABS, or the like, which contains a compatible material, is preferably used. Where only the effect of TPE itself of the sealant layer is expected, modified polyphenyl oxide (modified PPO), polycarbonate (PC), or the like, which contains no compatible material, may be used. However, sealability deteriorates due to the absence of the compatible effect.

Figure 4:
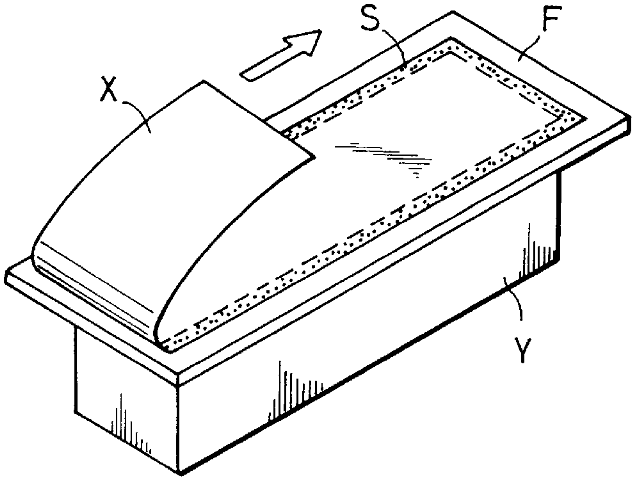
FIG. 4 is a perspective view showing an example of a developer container of the present invention.
Figure 5:
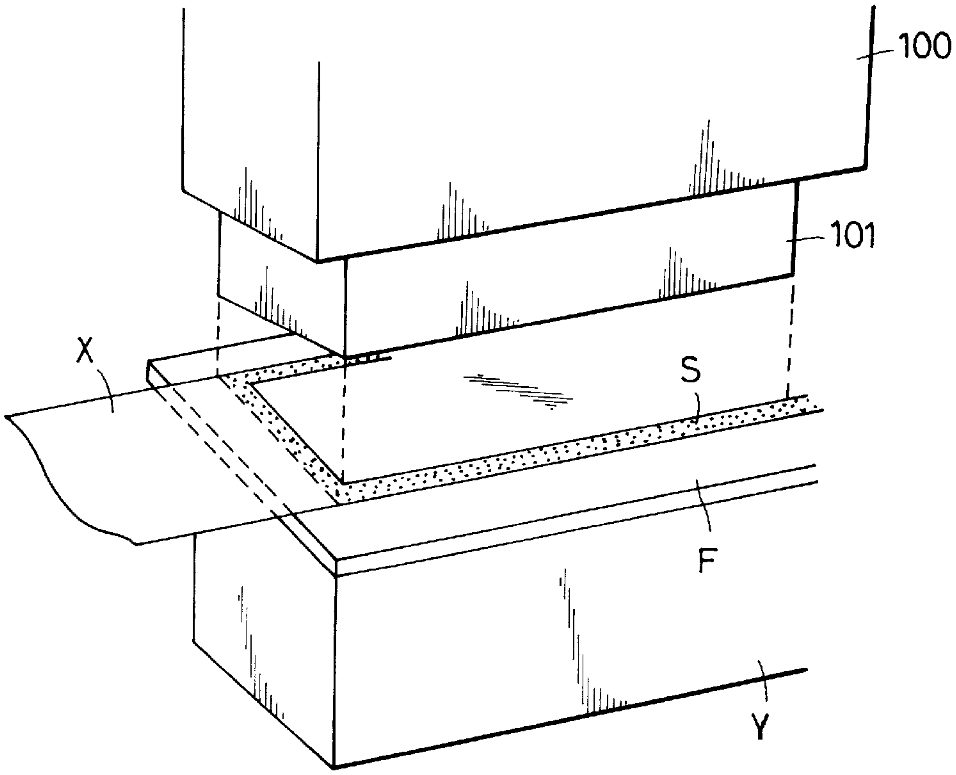
FIG. 5 is a drawing illustrating the method of heat-sealing a developer seal to a developer container.

The seal X is heat-sealed to the seal surface S provided on the flange F of the toner container Y, as shown in FIGS. 4 and 5.

Figure 6:
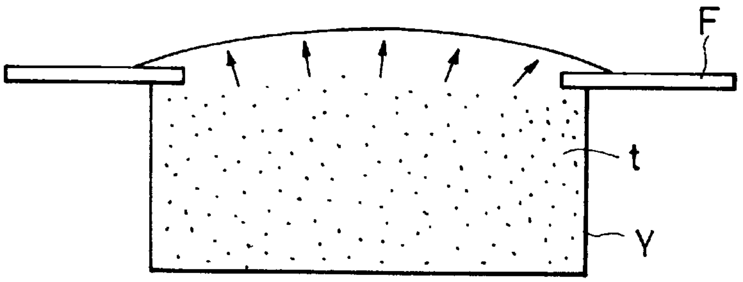
FIG. 6 is a sectional view showing a state of a developer container sealed with a developer seal.

At this time, the seal width of the seal surface S, i.e., the width of a seal bar 101 of a seal horn 100, must be sufficient for sealing toner t in the toner container Y against falling, impact or pressure, as shown in FIG. 6, and the width is preferably about 2 to 4 mm.

As the method of sealing the seal X to the toner container Y, heat sealing, impulse sealing, and the like can be used.

Figure 7:
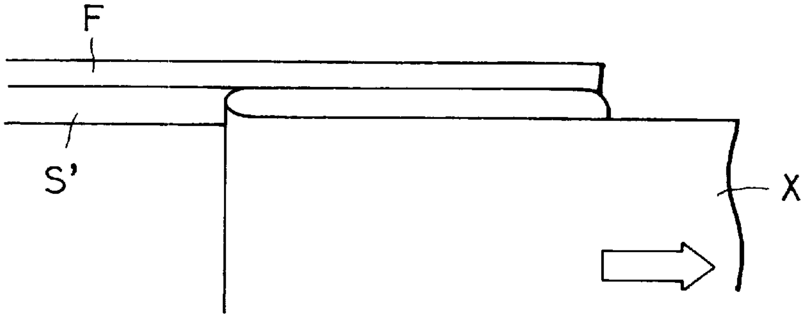
FIG. 7 is a drawing showing a state in which a developer seal is broken.

When the toner seal X is broken after being sealed to the toner container Y, as shown in FIG. 7, care must be taken to prevent the sealant from remaining on the seal peeling surface S' of the toner container Y. The occurrence of the residual sealant causes mixing of the toner t in the toner container Y and the sealant, thereby causing image defects such as white stripes or the like.

Figure 8:
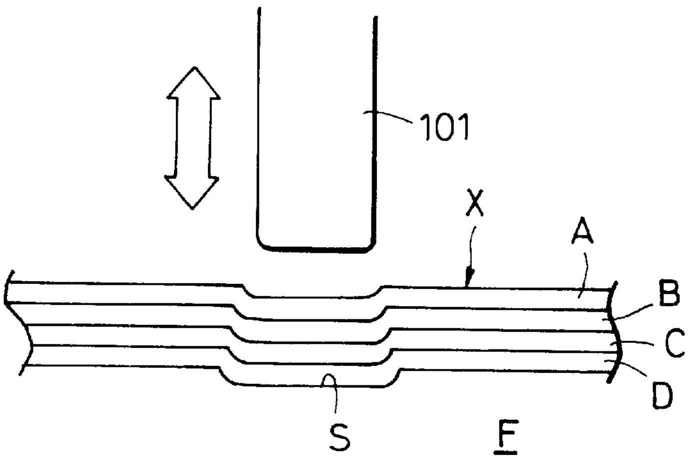
FIG. 8 is a drawing showing a state in which a developer seal is heat-sealed.

Therefore, it is very important to control the material and thickness of the sealant layer D, and the seal pressure and heat of the seal bar 101 shown in FIG. 8.

For example, with excessive seal pressure, seal temperature and seal time, the amount of forcing of the seal surface S of the toner container Y is about 1 mm, while the amount of forcing is generally about 0.1 to 0.5 mm. In this case, the sealant layer D is extruded from the edge of the seal bar 101 and causes residual sealant as sealant accumulation at the time of peeling of the seal. Therefore, it is necessary to set sealing conditions with a good balance so as to prevent excessive forcing.

Although, in the above-mentioned embodiment, the toner seal X comprising an easy peel film has a four-layer structure, a three-layer structure comprising a single substrate, or a two-layer structure comprising only the substrate and the sealant layer D without the cushion layer C may be used with no problem. The seal structure is not limited as long as the sealant layer D of the present invention is used.

Figure 2:
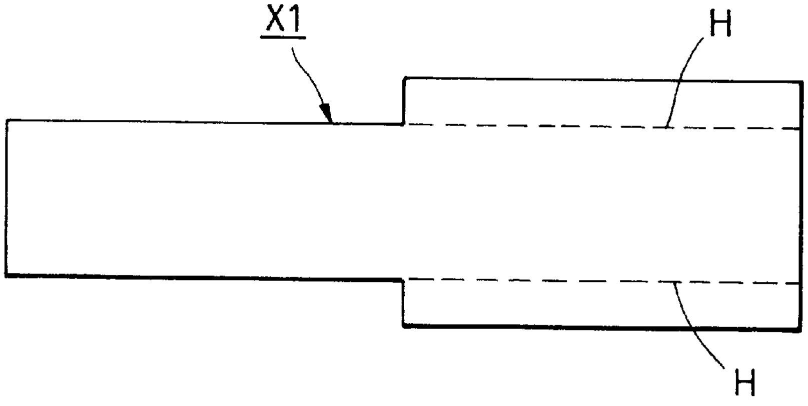
FIG. 2 is a plan view showing an example of a tear developer sealing member of the present invention.

Alternatively, the seal may comprise a tear sealing member X1, as shown in FIG. 2. In this tear sealing member X1, only the opening portion is made easy to tear by half cut H or the like, thereby enabling a reduction of cost of the seal.

Figure 3:
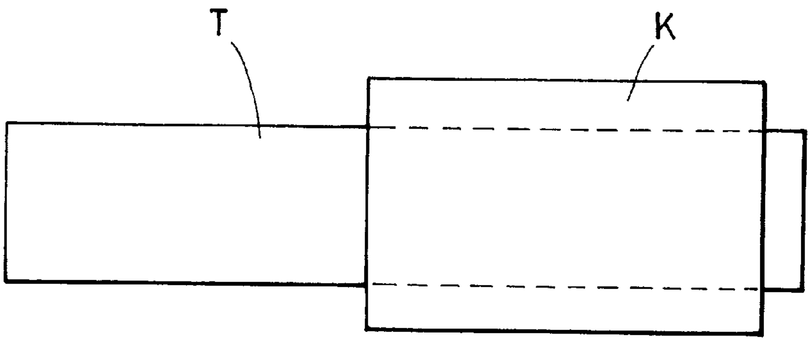
FIG. 3 is a plan view showing an example of a tear sealing member using a developer seal of the present invention as a tear tape.

Further, as shown in FIG. 3, a tear sealing member comprising a tear tape T and a cover film K may be used, which are disclosed in Japanese Patent Laid-Open Nos. 1-223485, 3-39763 and 7-56428. In this case, the toner seal of the present invention can be used as the tear tape T.

Where the toner container Y (refer to FIG. 4) is incorporated as a part in a known process cartridge, good sealability is exhibited. Particularly, the toner container Y is very effective means as a measure against toner leakage of a large process cartridge during distribution.

Furthermore, with respect to sealing workability, the sealing work can stably be carried out without causing an abrupt increase in film tension due to blocking of films delivered from an original seal.

Even after the process cartridge has been stored in an environment of high temperature and high humidity, stable operationality can be obtained without blocking between the sealant layer of the sealing member and the end seal.

Figure 18:
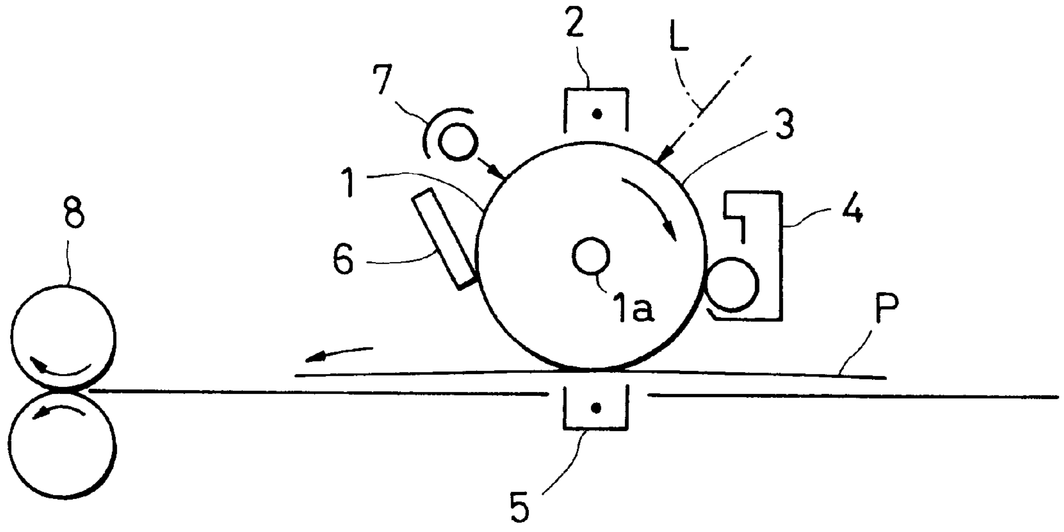
FIG. 18 is a drawing showing the configuration of a general transfer type electrophotographic apparatus.

FIG. 18 schematically shows the construction of a general transfer type electrophotographic apparatus using a drum type photosensitive member.

In FIG. 18, a drum type photosensitive member 1 serving as an image holding member is rotated in the direction of an arrow around the shaft 1*a* at the predetermined peripheral speed. The periphery of the photosensitive member 1 is uniformly charged to the predetermined positive or negative potential by charging means 2 during the rotation process, and then subjected to image exposure L (slit exposure, laser beam scanning exposure, or the like) by image exposure means (not shown) in an exposure region 3 to successively form an electrostatic latent image on the periphery of the photosensitive member 1 corresponding to the exposed image.

The electrostatic latent image is then developed by development means 4 using a toner, and the toner developed image is successively transferred, by transfer means 5, to the surface of a transfer material P which is fed between the photosensitive member 1 and the transfer means 5 from a feeding unit not shown in the drawing with periodically timing to coincide with the rotation of the photosensitive member 1.

The transfer material P to which the image is transferred is separated from the surface of the photosensitive member 1, and introduced into image fixing means 8 for fixing the image to be printed out as a copy to the outside of the apparatus.

After image transfer, the toner remaining on the surface of the photosensitive member 1 is removed by cleaning means 6 to clean the surface which is then destaticized by exposure means 7 to be used again for image formation.

As the uniform charging means 2 for the photosensitive member 1, a corona charging device is generally popular. As the transfer device 5, corona transfer means is generally popular. In the electrophotographic apparatus, a plurality of components such as the photosensitive member, the development means, the cleaning means, and the like may be integrally combined to form a process cartridge so that the process cartridge is detachable from the body of an image forming apparatus (for example, a copying machine, a laser beam printer, and the like). For example, the development means (the development means having at least the developer container) may be integrally supported together with the photosensitive member to form a process cartridge so that the process cartridge is detachable from the body of the apparatus by using guide means such as a rail or the like.

EXAMPLES

Example 1

The developer seal shown in FIG. 1 was produced. The structure of the seal was as follows:

Substrate A: biaxially oriented polyester film having a thickness of 16 $\mu$m

Substrate B: oriented polyamide film having a thickness of 25 $\mu$m

Cushion layer C: polyethylene layer having a thickness of 30 $\mu$m and a weight average molecular weight of about 10,000

| | |
|---|---|
| Sealant layer D: linear low-density polyethylene (LLDPE) | 90.0 parts (weight) |
| styrene-ethylene-butadiene-styrene elastomer (SEBS) | 10.0 parts (weight) |

The sealant layer had a thickness of 40 $\mu$m.

In polymerization of LLDPE, zirconocene dichloride as a metallocene catalyst was used as a main catalyst, and methyl aluminoxane was used as a co-catalyst, and the vapor phase polymerization method under a pressure of 100 atm or less was used.

The thus-completed LLDPE showed a GPC molecular weight distribution having a molecular weight dispersion (Mw/Mn) of 2.11, no low-molecular-weight component having a molecular weight of $1\times10^3$ or less, and only one peak at $9.95\times10^4$.

The conditions of the GPC measurement method were as follows:

Apparatus: Gel permeation chromatograph, GPC-150C produced by WATERS Co., Ltd.

Column: AD806MS (three) produced by Showa Denko K. K.

Solvent: Orthodichlorobenzene

Flow rate: 1.0 ml/min

Temperature: 140° C.

Detector: Infrared (IR) absorption: 3.42 μm (i.e., detection of absorption sensitivity of polyethylene)

| | | |
|---|---|---|
| Sample: | Concentration | 20 mg/10 ml |
| | Solubility | completely soluble by heating |
| | Filtration | metal sintered filter |

Injection amount: 200 μl

Measurement was carried out under the above conditions, and the molecular weight of a sample was calculated by using a molecular weight calibration curve formed by using a monodisperse polyethylene standard sample.

Figure 9:
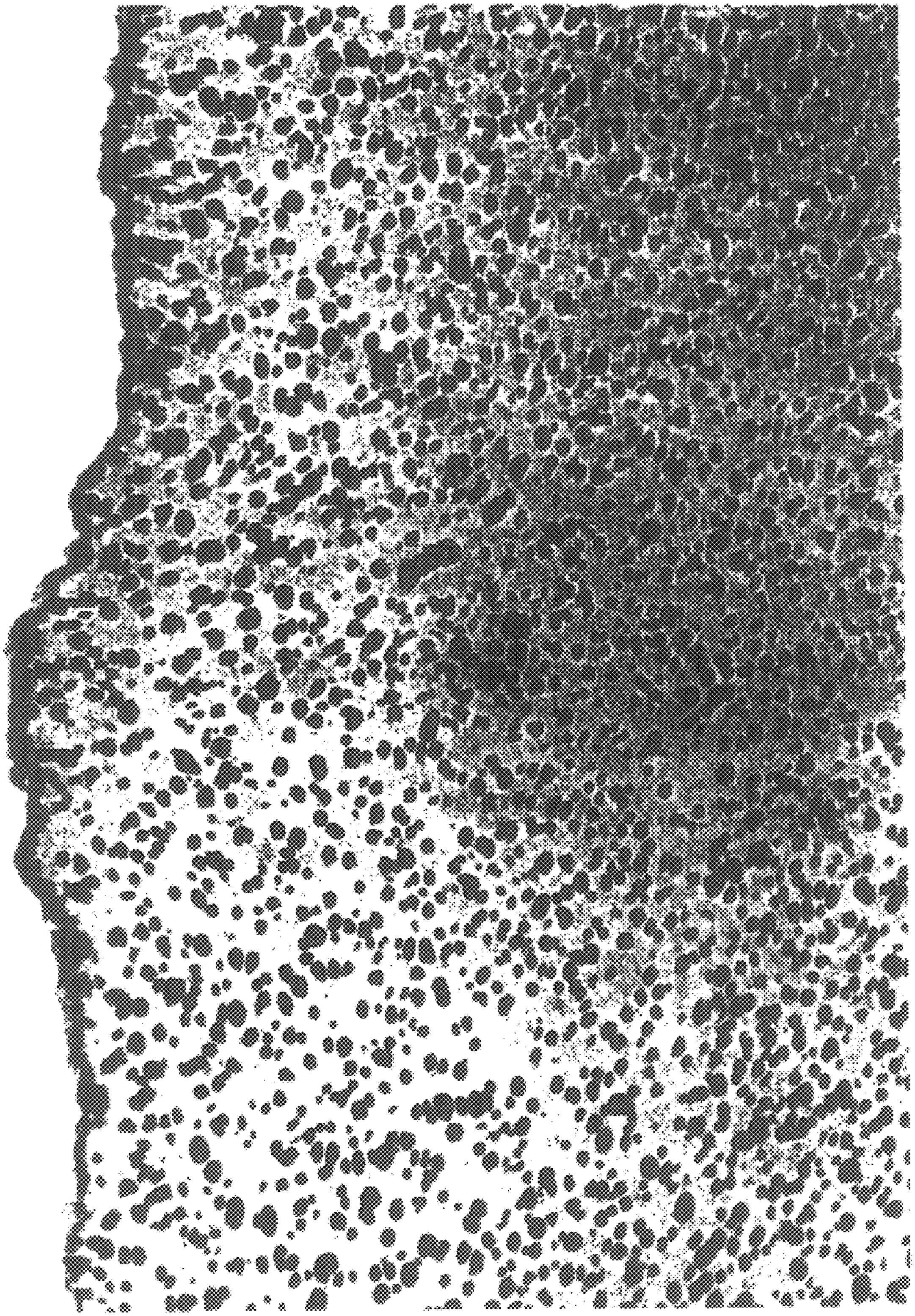
FIG. 9 is a TEM photograph of a section of a sealant layer of a developer seal in an example.
Figure 10:
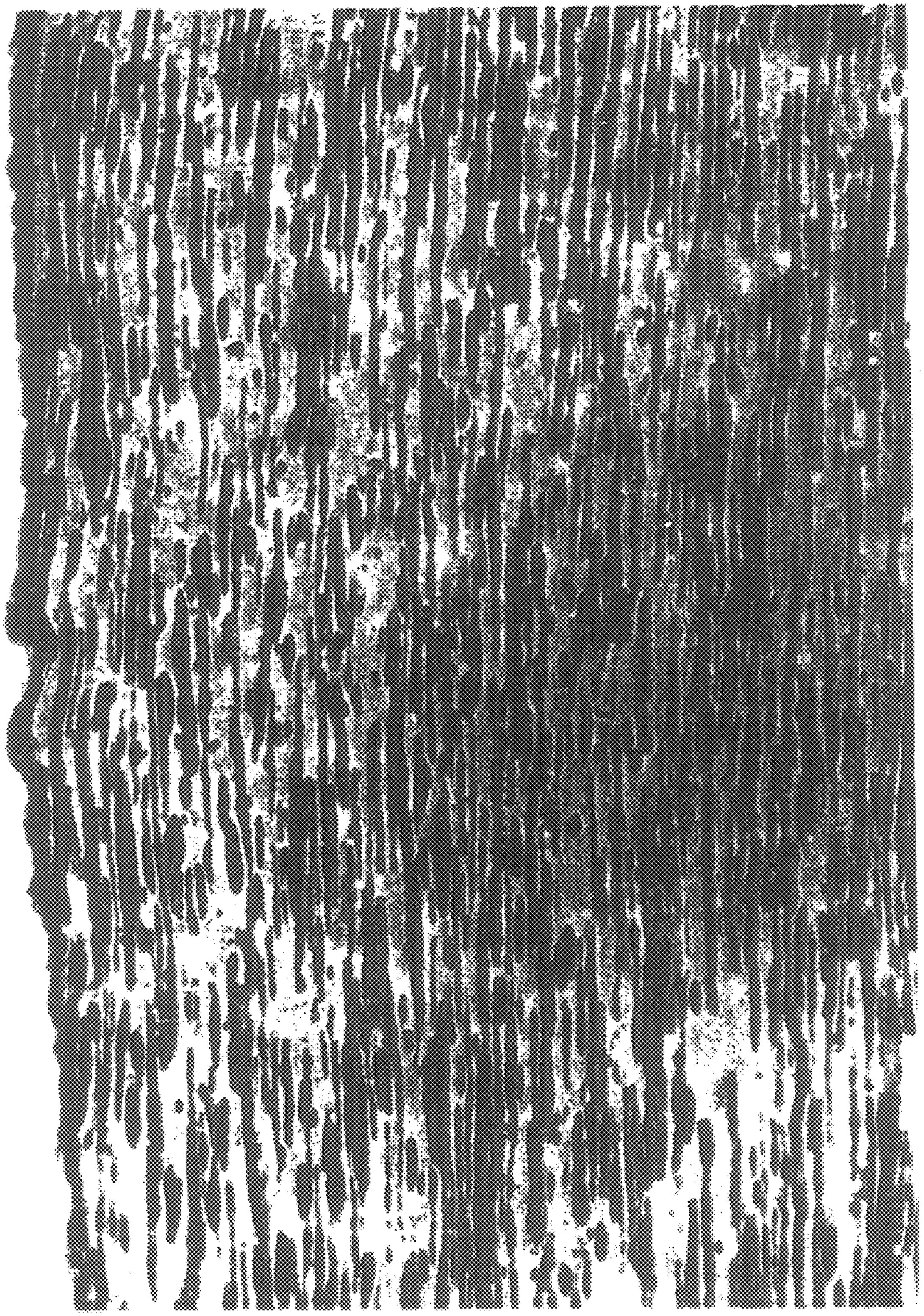
FIG. 10 is a TEM photograph of a non-section of a sealant layer of a developer seal in an example.

FIG. 9 is a transmission electron microscope (TEM) photograph (a magnification of ×20,000) of a section of a sealant layer perpendicular to the extrusion direction, which was formed by extrusion from a mold, frozen, cut into thin pieces of about 100 nm and then dyed with ruthenium tetraoxide. FIG. 10 is a photograph (a magnification of ×20,000) of a section of the same piece in parallel with the extrusion direction. In both photographs, black portions are SEBS of the dispersed material, and dispersedly mixed SEBS particles are uniformly dispersed in the sealant layer D. The SEBS particles have a rod-like form, and a thickness of 0.05 to 0.2 μm.

After an original seal (width 500 mm, winding length 1000 m) of the toner seal X produced as described above was allowed to stand at 40° C. and 90% in an environment of high temperature and high humidity for 48 hours, a film unwinding test was carried out to measure blocking between films (the first substrate A side and the sealant layer D side). As a result, the films could be smoothly wound and unwound without an abrupt increase in film tension. It was thus confirmed that no blocking occurred in the original seal.

The toner container Y was formed by injection molding flame-retardant V2 grade HIPS used as a material containing 1.3% by weight of stearate, 5.9% by weight of bromine flame retardant, and 1.6% by weight of inorganic flame retardant based on the total weight, and butadiene particles (average particle diameter of 0.65 μm), which were uniformly dispersedly contained as a compatible material.

The toner container Y had an opening width of as large as 70 mm, and a large size having a content volume of about 1000 cc, and a toner fill of about 500 g.

Figure 11:
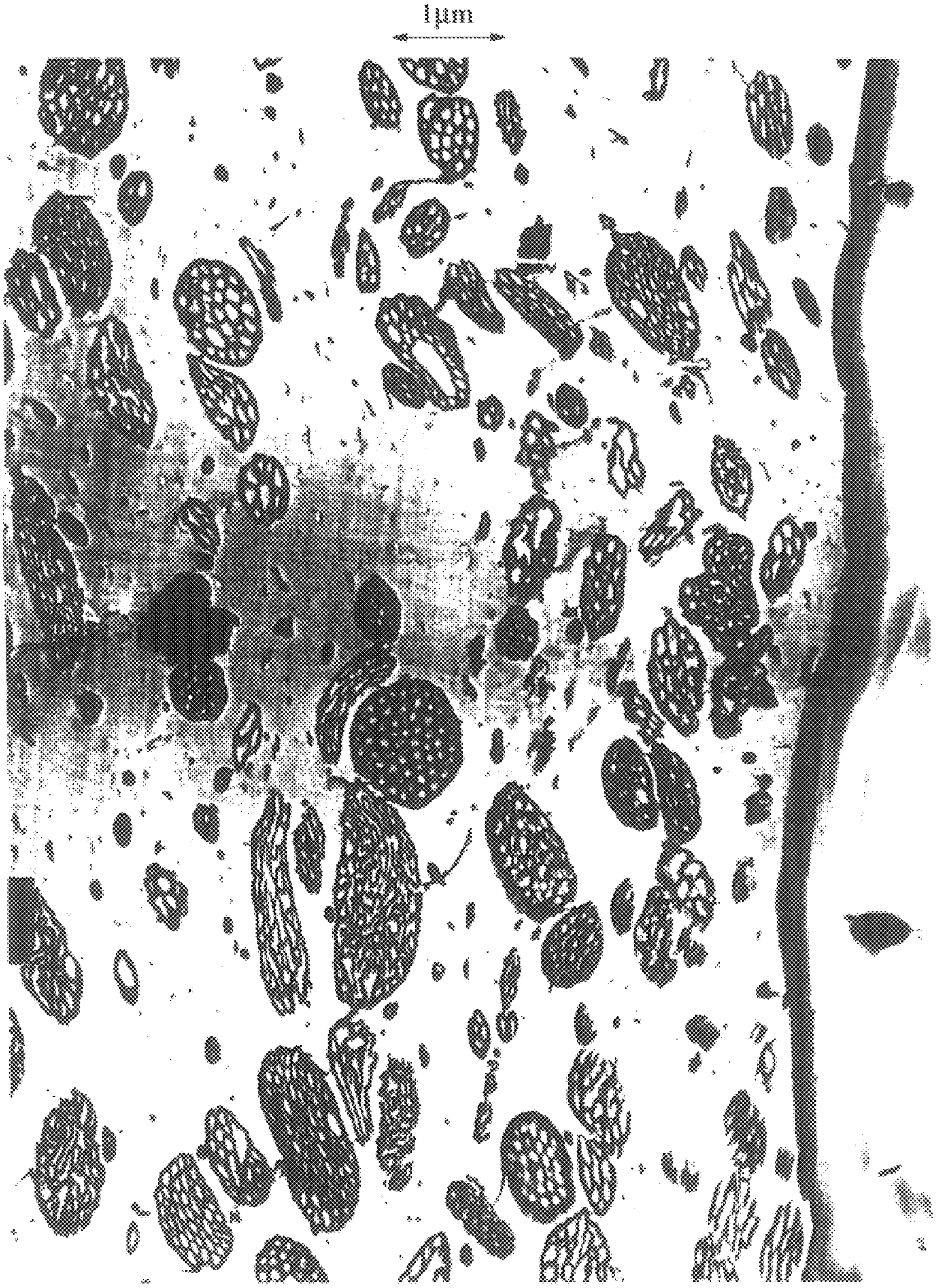
FIG. 11 is a TEM photograph of a section of a HIPS toner container in an example.
Figure 12:
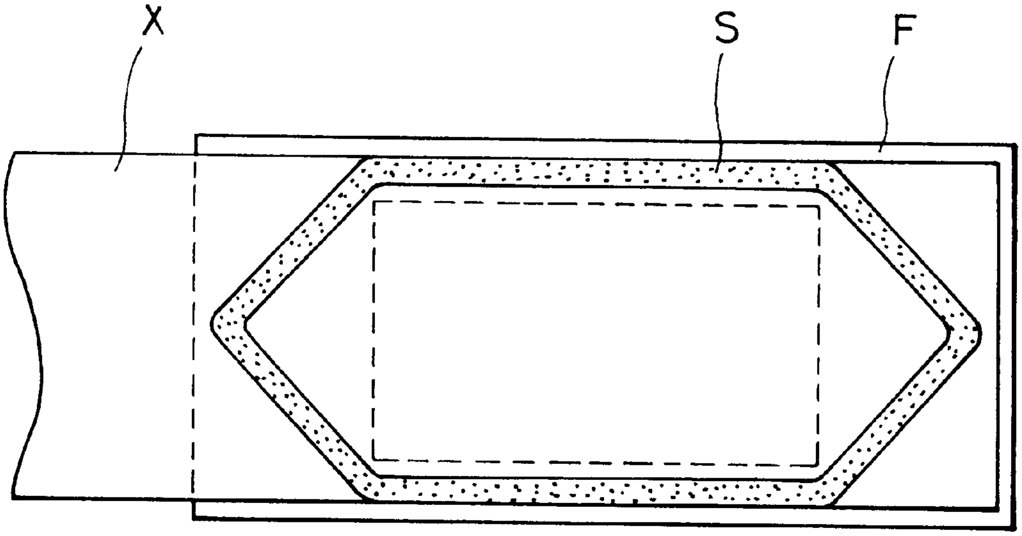
FIG. 12 is a drawing showing a pattern of a developer seal in an example.

FIG. 11 shows a TEM photograph of the dispersed state of polybutadiene.

The result of TEM photography at a magnification of ×20,000 shown in FIG. 11 reveals that polybutadiene particles are substantially uniformly dispersed in an island-like structure in PS, and have a particle diameter of about 0.1 to 1 μm. In FIG. 11, PS is shown by a white portion, and the polybutadiene particles are shown by island-like network portions.

The developer seal X was heat-sealed under the conditions below, as shown in FIG. 4.

The developer seal X was heat-sealed to the seal surface S provided on the flange F of the toner container Y, as shown in FIG. 5. The seal width of the seal surface S, i.e., the width of the seal bar 101 of the seal horn 100, was 3 mm.

The sealing conditions included a heating temperature of 130° C., a seal surface pressure of 10 kgf/cm$^2$, and a sealing time of 2 seconds. In heat sealing of the seal X under these conditions, bite into the seal surface S was 10 μm.

The seal pattern had angular leading and tailing ends so as to suppress an increase in unsealing strength.

Figure 13:
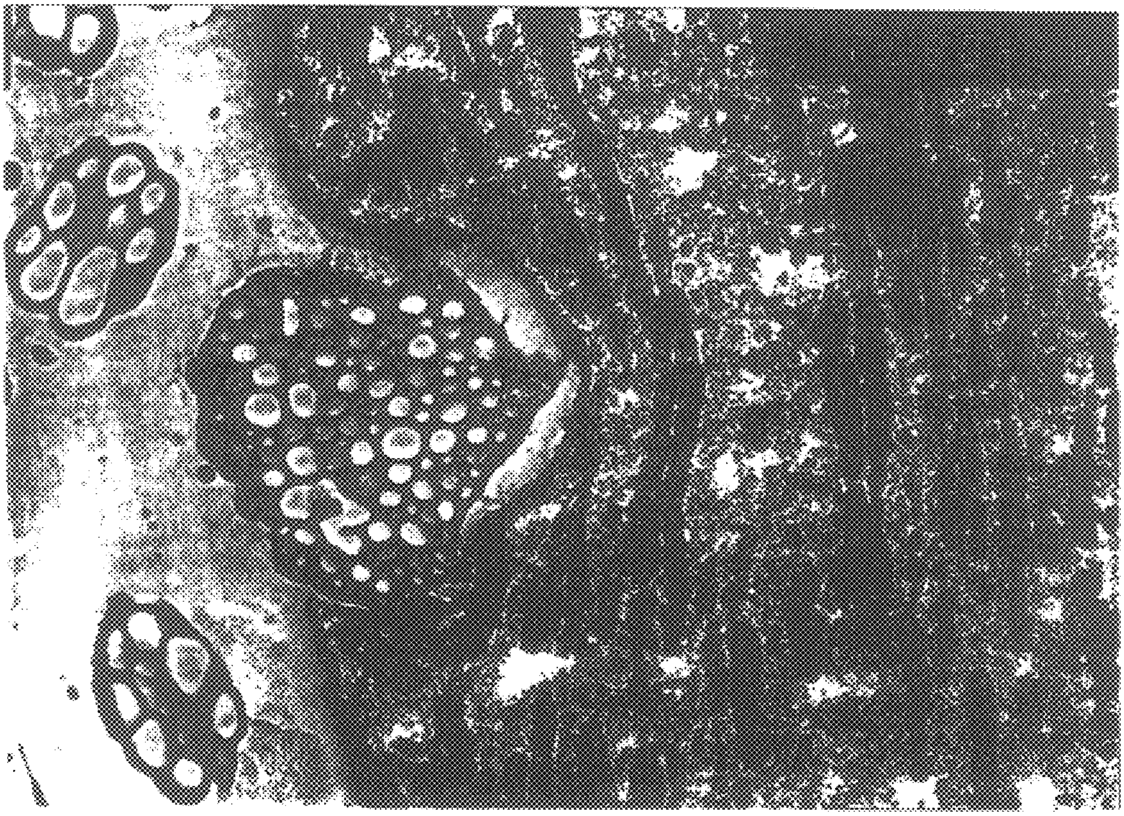
FIG. 13 is a TEM photograph of a section of a seal interface where a dispersed material of a sealant layer and a compatible material in a toner container seal area are dissolved in and combined with each other.
Figure 14:
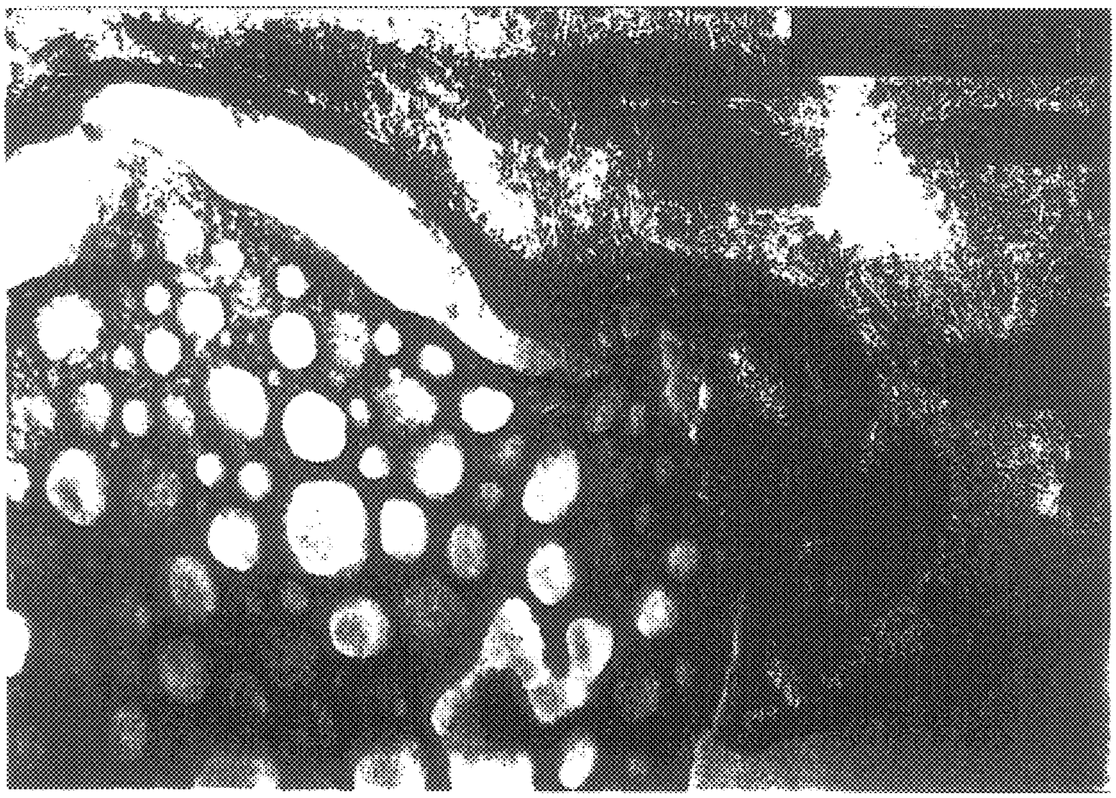
FIG. 14 is a TEM photograph at a magnification different from FIG. 13.

FIGS. 13 and 14 are photographs of a section of the heat seal interface. FIG. 13 is a TEM photograph at a magnification of ×40,000, and FIG. 14 is a TEM photograph at a magnification of ×100,000.

FIGS. 13 and 14 indicate a state in which the SEBS particles shown in the lower side of the photographs, which were dispersedly mixed in the sealant layer D of the seal X, and the polybutadiene particles shown in the upper side of the photographs, which were dispersedly mixed in HIPS of the toner container Y, are dissolved in each other as if both types of particles are fused to each other in the seal interface by heat and pressure of heat sealing, i.e., the particles are joined to each other with the surfaces thereof partially broken.

After heat sealing, a section of the seal peeling surface of the seal surface S of the toner container Y was also observed after the seal X was peeled.

Figure 15:
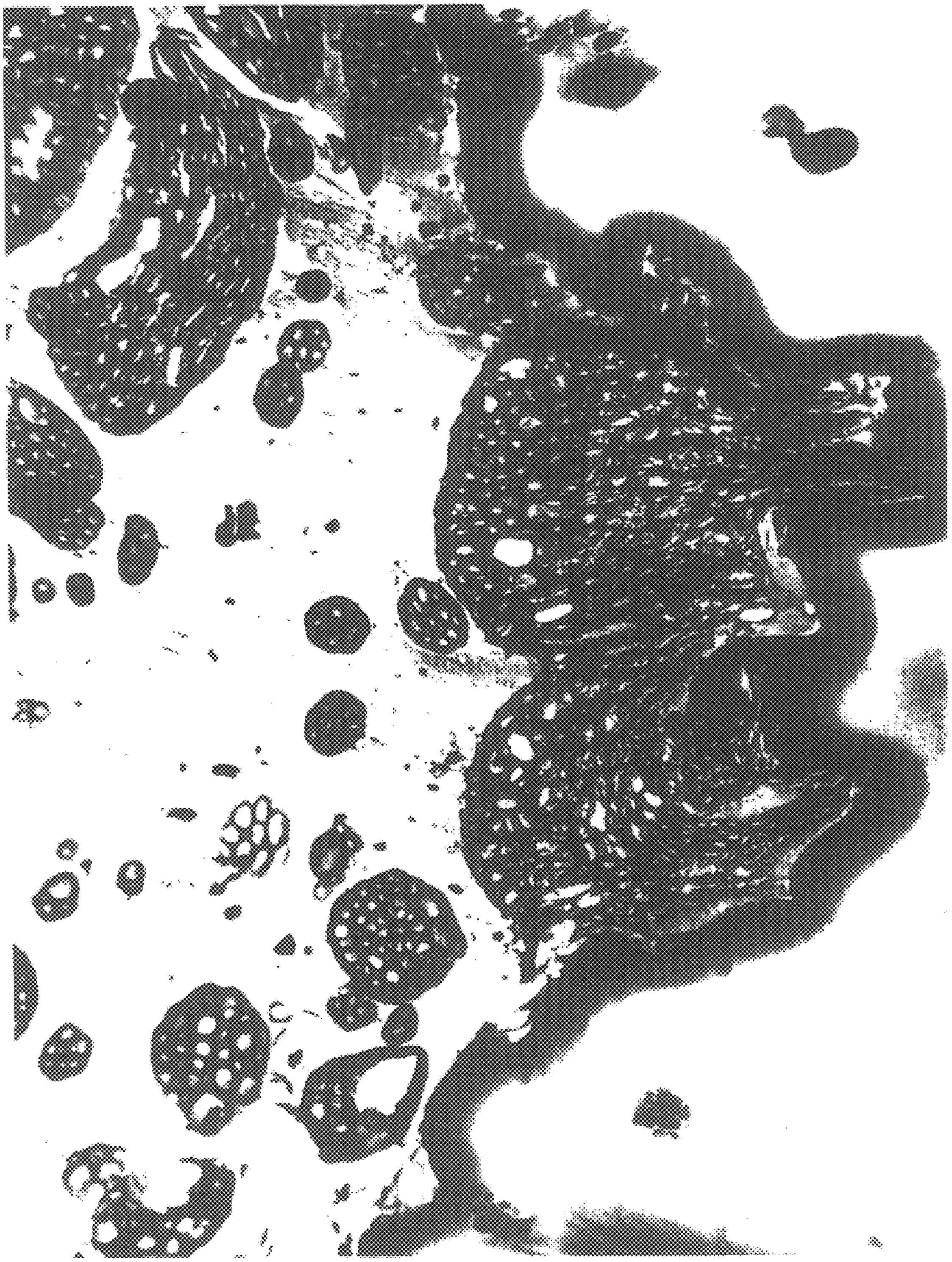
FIG. 15 is a TEM photograph of a section of a seal surface after a developer seal is peeled from a toner container in an example.

FIG. 15 is a TEM photograph (×20,000) of a section of the seal peeling surface. FIG. 15 shows that in the seal peeling surface, the dissolved bond portions of the polybutadiene particles are stretched by peeling of the seal.

Evaluation of Sealability

In order to evaluate the sealability of the toner container Y produced in this embodiment, besides a distribution test, the unsealing strength and residual sealant were measured, and blocking was also measured after the toner container Y was combined with a development frame and then allowed to stand in an environment of high temperature and high humidity. The results are shown in Table 1.

As the evaluation method of the distribution test, the toner container Y filled with toner (one-component magnetic toner; average particle diameter of 7 μm) was placed in a packaging box, allowed to stand at about −5° C. for 24 hours, dropped from a height of 80 cm with freedom for one angle, three edges and six sides, and then measured with respect to toner leakage.

As a result, no toner leakage occurred due to peeling of the seal after the distribution test, and good sealability was obtained. The unsealing strength was about 3 kgf with good operationality, and no residual sealant occurred after unsealing. The seal X thus had excellent performance.

Measurement of Blocking of Development Unit

Figure 17:
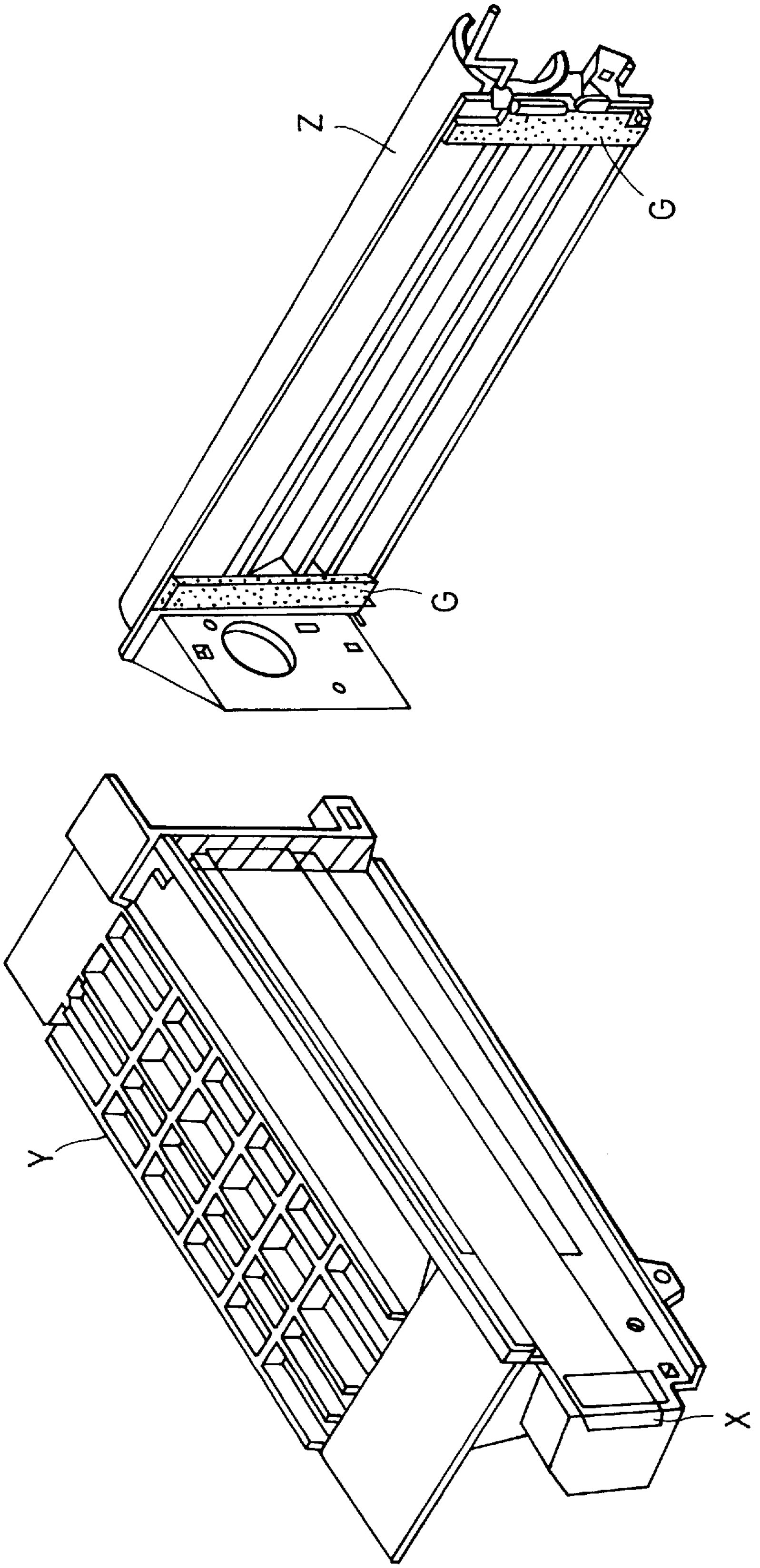
FIG. 17 is a drawing showing a state wherein a toner container is united with a development frame.

As shown in FIG. 17, the toner container Y was united to the development frame Z by ultrasonic fusion only in the lengthwise portions of both frames, with the free end of the seal X folded. In order to prevent toner leakage between the toner container and the development frame Z, an end seal G made of foamed polyurethane and having a thickness of 2 mm was bonded to both ends of the back of the development fame Z in the lengthwise direction. The end seals G are compressed to about a half thickness (1 mm) after both frames are united, thereby preventing toner leakage after unsealing.

After the thus-produced development unit was allowed to stand in an environment of high temperature and high humidity at 40° C. and 90% for 48 hours, the unsealing strength was measured. As a result, the unsealing strength was 5 kgf or less, which was the same as the development unit produced by the same method and allowed to stand in an environment of room temperature, and good operationality was obtained.

These results indicate that no blocking occurs between the surface of the sealant layer D of the seal X and the end seals G.

Examples 2 and 3

A seal X, a toner container and a development unit were produced by the same method as Example 1 except that the amount of the SEBS particles added to the sealant layer of the seal X was 1% by weight (Example 2) or 29.5% by weight (Example 3). The unwinding (blocking) test of an original seal, evaluation of sealability, and measurement of blocking in the development unit were carried out.

The results shown in Table 1 indicate that there is no problem.

Examples 4 to 6

A seal X, a toner container and a development unit were produced by the same method as Example 1 except that the dispersed material added to the sealant of the seal X was styrene-butadiene-styrene elastomer (SBS), and the amount of the SBS particles added to the sealant layer of the seal X was 10% by weight (Example 4), 1% by weight (Example 5), or 29.5% by weight (Example 6). The unwinding (blocking) test of an original seal, evaluation of sealability, and measurement of blocking in the development unit were carried out.

The results shown in Table 1 indicate that there is no problem.

Examples 7 to 9

A seal X, a toner container and a development unit were produced by the same method as Example 1 except that the dispersed material added to the sealant of the seal X was syndiotactic 1,2-polybutadiene (1,2-PB) having a crystallization degree of 20%, and the amount of the 1,2-PB particles added to the sealant layer of the seal X was 10% by weight (Example 7), 1% by weight (Example 8), or 29.5% by weight (Example 9). The unwinding (blocking) test of an original seal, evaluation of sealability, and measurement of blocking in the development unit were carried out.

The results shown in Table 1 indicate that there is no problem.

Example 10

Figure 16:
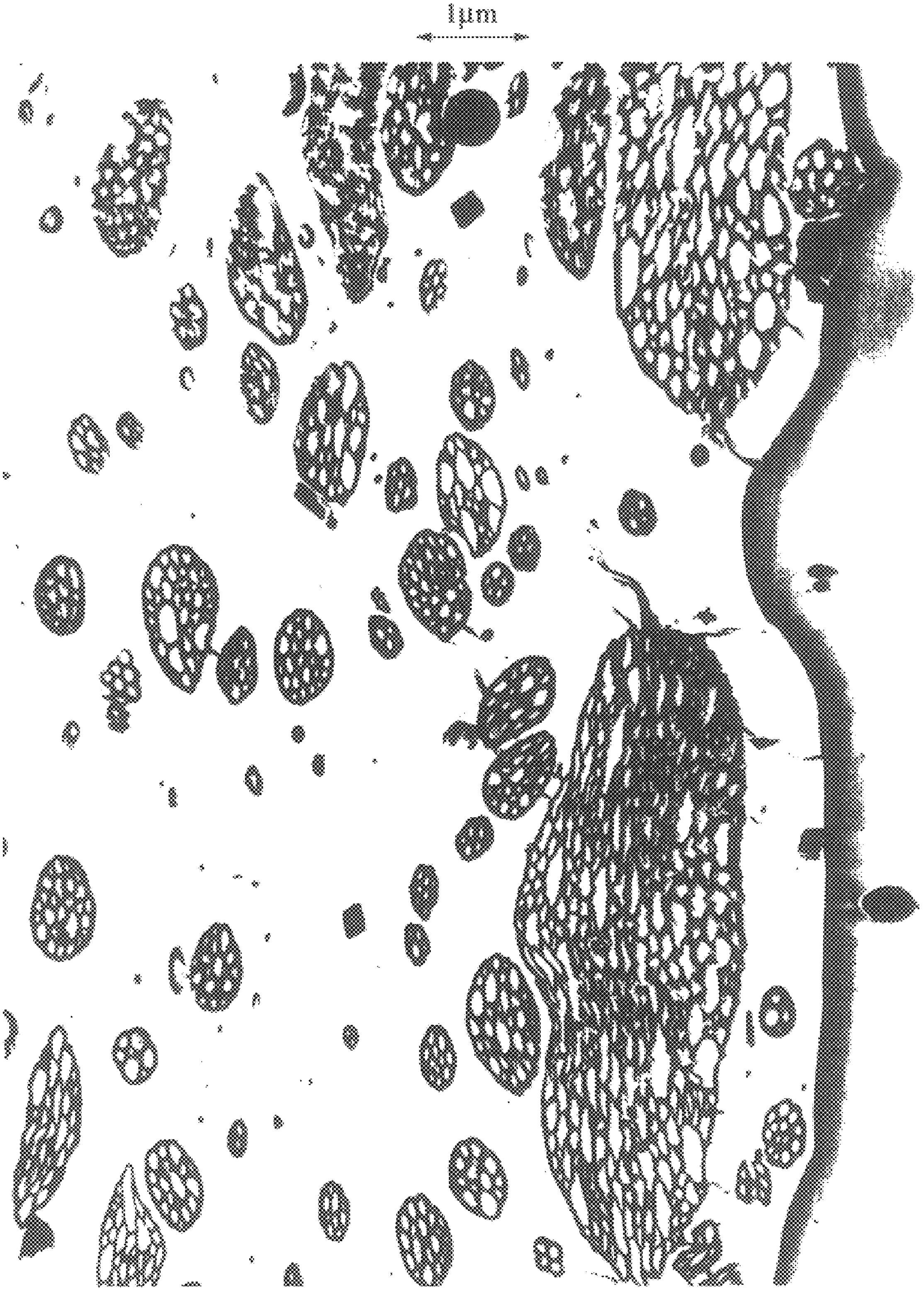
FIG. 16 is a TEM photograph of a section of a HIPS toner container in an example.

A toner container Y was formed by the same injection molding as Example 1 except that HIPS used comprised a mixture of polybutadiene large particles of about 3 to 4 μm, and small particles of about 0.5 to 1.5 μm, which had an average particle diameter of 0.75 m, and an incompletely uniform rubber dispersion state, as shown in a TEM section photograph (a magnification of ×20,000) of FIG. 16. Then, sealability was evaluated.

The results shown in Table 1 indicate that there is no problem.

Example 11

A toner container Y was formed by the same injection molding as Example 1 except that acrylonitrile-butadiene-styrene copolymer (ABS), and butadiene particles (average particle diameter of 0.62 μm) as a compatible material were used. Then, sealability was evaluated.

The results shown in Table 1 indicate that there is no problem.

Example 12

A toner container Y was formed by the same injection molding as Example 1 except that polycarbonate-acrylonitrile-butadiene-styrene copolymer (PC-ABS), and butadiene particles (average particle diameter of 0.60 μm) as a compatible material were used. Then, sealability was evaluated.

The results shown in Table 1 indicate that there is no problem.

Examples 13 and 14

LLDPE of the sealant layer of the seal X of Example 1 was changed to the following LLDPE copolymer.

An ethylene-octene copolymer was produced by a solution polymerization method using the same metallocene catalyst as Example 1.

E:octene=80:20 (weight ratio) Example 13

E:octene=60:40 (weight ratio) Example 14

The amount of the ethylene-octene copolymer was 98 parts by weight, and the SEBS amount was 2 parts by weight, based on the total of the sealant layer.

The resultant LLDPE had the following molecular weight distribution:

The molecular weight dispersion (Mw/Mn) was 2.61 (Example 13) and 2.98 (Example 14).

Low-molecular-weight components having molecular weights of $1\times10^3$ or less were not contained (Examples 13 and 14).

The molecular weight distribution showed only one peak at $4.61\times10^4$ (Example 13) and $4.98\times10^4$ (Example 14).

The seal X was produced as described above, and a toner container and a development unit were produced by the same method as Example 1. The unwinding (blocking) test of an original seal, evaluation of sealability, and measurement of blocking in the development unit were carried out.

The results shown in Table 1 indicate that there is no problem.

Comparative Example 1

A seal X, a toner container and a development unit were produced by the same method as Example 1 except that SEBS was not added to the sealant layer of the seal X. The unwinding (blocking) test of an original seal, evaluation of sealability, and measurement of blocking in the development unit were carried out.

The results shown in Table 1 indicate that toner leakage occurs due to peeling of the seal, and thus sealability is apparently inferior to Example 1.

Comparative Example 2

A seal X, a toner container and a development unit were produced by the same method as Example 1 except that the toner container Y was formed by injection molding using polystyrene not containing polybutadiene. The unwinding (blocking) test of an original seal, evaluation of sealability, and measurement of blocking in the development unit were carried out.

The results shown in Table 1 indicate that toner leakage occurs due to peeling of the seal, and thus sealability is apparently inferior to Example 1.

Comparative Example 3

LLDPE of the sealant layer of the seal X of Example 1 was produced by a solution polymerization using a conventional titanium catalyst under a pressure of 100 atm or less, i.e., a so-called Ziegler method.

The resultant LLDPE had the following molecular weight distribution in GPC:

The molecular weight dispersion (Mw/Mn) was 4.80.

Low-molecular-weight components having molecular weights of $1\times10^3$ or less were contained.

The molecular weight distribution showed only one peak at $1.63\times10^5$.

The seal X was produced as described above, and a toner container and a development unit were produced by the same method as Example 1. The unwinding (blocking) test of an original seal, evaluation of sealability, and measurement of blocking in the development unit were carried out.

The results shown in Table 1 indicate that blocking occurs in the original seal and the development unit.

Comparative Example 4

EVA was produced by block polymerization using ethylene and vinyl acetate as raw materials, and a titanium catalyst at a reaction temperature of 210° C. under a pressure of 2000 atm (i.e., the Ziegler method), and used in place of LLDPE of the sealant layer of the seal X of Example 1.

The resultant LLDPE had the following molecular weight distribution in GPC:

The molecular weight dispersion (Mw/Mn) was 12.38.

Low-molecular-weight components having molecular weights of $1\times10^3$ or less were contained.

The molecular weight distribution showed two peaks at $1.51\times10^5$ and $8.82\times10^3$.

The seal X was produced as described above, and a toner container and a development unit were produced by the same method as Example 1. The unwinding (blocking) test of an original seal, evaluation of sealability, and measurement of blocking in the development unit were carried out.

The results shown in Table 1 indicate that blocking occurs in the original seal and the development unit.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

TABLE 1

| | Sealant layer | | | | | | | | Evaluation | | | | |
|---|---|---|---|---|---|---|---|---|---|---|---|---|---|
| | Binder | Binder content (wt %) | Mw/Mn of binder | Component of $1\times10^3$ or less in GPC | Molecular weight peak in GPC | Dispersed material | Content of dispersed material (wt %) | Toner container material | Blocking of original seal | Unsealing force | Residual sealant after unsealing | Toner leakage in distribution test | CRG blocking |
| Example 1 | LLDPE | 90 | 2.11 | No | $9.95\times10^4$ | SEBS | 10 | HIPS | No | 3 kgf or less | No | No | No |
| Example 2 | LLDPE | 99 | 2.11 | No | $9.95\times10^4$ | SEBS | 1 | HIPS | No | 3 kgf or less | No | No | No |
| Example 3 | LLDPE | 70.5 | 2.11 | No | $9.95\times10^4$ | SEBS | 29.5 | HIPS | No | 3 kgf or less | No | No | No |
| Example 4 | LLDPE | 90 | 2.11 | No | $9.95\times10^4$ | SEBS | 10 | HIPS | No | 3 kgf or less | No | No | No |
| Example 5 | LLDPE | 99 | 2.11 | No | $9.95\times10^4$ | SBS | 1 | HIPS | No | 3 kgf or less | No | No | No |
| Example 6 | LLDPE | 70.5 | 2.11 | No | $9.95\times10^4$ | SBS | 29.5 | HIPS | No | 3 kgf or less | No | No | No |
| Example 7 | LLDPE | 90 | 2.11 | No | $9.95\times10^4$ | 1,2-PB | 10 | HIPS | No | 3 kgf or less | No | No | No |
| Example 8 | LLDPE | 99 | 2.11 | No | $9.95\times10^4$ | 1,2-PB | 1 | HIPS | No | 3 kgf or less | No | No | No |
| Example 9 | LLDPE | 70.5 | 2.11 | No | $9.95\times10^4$ | 1,2-PB | 29.5 | HIPS | No | 3 kgf or less | No | No | No |
| Example 10 | LLDPE | 90 | 2.11 | No | $9.95\times10^4$ | SEBS | 10 | HIPS *1) | No | 3 kgf or less | No | No | No |
| Example 11 | LLDPE | 90 | 2.11 | No | $9.95\times10^4$ | SEBS | 10 | ABS | No | 3 kgf or less | No | No | No |
| Example 12 | LLDPE | 90 | 2.11 | No | $9.95\times10^4$ | SEBS | 10 | PC-ABC | No | 3 kgf or less | No | No | No |
| Example 13 | *2) | 98 | 2.61 | No | $4.61\times10^4$ | SEBS | 2 | HIPS | No | 3 kgf or less | No | No | No |
| Example 14 | *3) | 98 | 2.98 | No | $4.98\times10^4$ | SEBS | 2 | HIPS | No | 3 kgf or less | No | No | No |
| Comp. Example 1 | LLDPE | 100 | 2.11 | No | $9.95\times10^4$ | No | 0 | HIPS | No | 3 kgf or less | No | Present | No |
| Comp. Example 2 | LLDPE | 90 | 2.11 | No | $9.95\times10^4$ | SEBS | 10 | PS | No | 3 kgf or less | No | Present | No |

TABLE 1-continued

| | Sealant layer | | | | | | | Evaluation | | | | |
|---|---|---|---|---|---|---|---|---|---|---|---|---|
| | Binder | Binder content (wt %) | Mw/Mn of binder | Component of $1 \times 10^3$ or less in GPC | Molecular weight peak in GPC | Dispersed material | Content of dispersed material (wt %) | Toner container material | Blocking of original seal | Unsealing force | Residual sealant after unsealing | Toner leakage in distribution test | CRG blocking |
| Comp. Example 3 | LLDPE *4) | 90 | 4.80 | Present | $1.63 \times 10^5$ | SEBS | 10 | HIPS | Present | 3 kgf or less | No | No | Present |
| Comp. Example 4 | EVA | 90 | 12.38 | Present | $1.51 \times 10^5$ $8.82 \times 10^3$ | SEBS | 10 | HIPS | Present | 3 kgf or less | No | No | Present |

*1) Mixture of PB large and small particles
*2) Ethylene-octene copolymer (80:20)
*3) Ethylene-octene copolymer (60:40)
*4) Synthesized with the Ziegler catalyst.

What is claimed is:

1. A developer container with a sealed opening for containing a developer, comprising:

a sealing member for sealing an opening of said developer container, said sealing member comprising a sealant layer containing a dispersed material dispersed therein, wherein a sealant main component of said sealing member is a low-molecular-weight polyolefin polymer synthesized by using a metallocene catalyst; and a sealing area contacting said sealing member, wherein a material compatible with the dispersed material dispersedly contained in said sealant layer of said sealing member is dispersedly contained in at least said sealing area of the container.

2. A developer container according to claim 1, wherein the low-molecular-weight polyolefin polymer is a linear low-density polyethylene or copolymer thereof, and a linear low-density polyethylene component is contained in an amount of 50 to 99% by weight based on the total amount of the sealing member.

3. A developer container according to claim 1, wherein the low-molecular-weight polyolefin polymer shows a molecular weight distribution in gel permeation chromatography (GPC), which has a molecular weight dispersion (Mw/Mn) of 1 to 3 and a peak in the region of $1\times10^4$ to $1\times10^6$, and contains no component having a molecular weight of $1\times10^3$ or less.

4. A developer container according to claim 1, wherein the dispersed material in the sealant layer is a thermoplastic elastomer.

5. A developer container according to claim 1, wherein the compatible material dispersedly contained in the sealing area of the container is a butadiene material, and the dispersed material in the sealant layer is an elastomer selected from styrene elastomers containing butylene, and polybutadiene.

6. A developer container according to claim 5, wherein the styrene elastomer is selected from the group consisting of styrene-butadiene-styrene block copolymers, styrene-ethylene-butadiene-styrene block copolymers, and syndiotactic 1,2-polybutadiene.

7. A developer container according to claim 1, wherein the dispersed material in the sealant layer is dispersed in a low-molecular-weight polyolefin polymer.

8. A developer container according to claim 1, wherein the compatible material dispersedly contained in at least the sealing area of the container is a butadiene material.

9. A developer container according to claim 1, wherein the dispersed material in the sealant layer is an elastomer containing butadiene.

10. A developer container according to claim 1, wherein the sealant layer contains 0.5 to 30 wt % of the dispersed material.

11. A developer container according to claim 1, wherein the container is molded with a resin selected from the group consisting of high impact polystyrene (HIPS), acrylonitrile-butadiene-styrene copolymers (ABS), and polycarbonate-acrylonitrile-butadiene-styrene copolymers (PC-ABS).

12. A developer container according to claim 1, wherein the opening of the container is sealed with the sealing member in a state in which the dispersed material in the sealant layer and the compatible material in the sealing area of the container are dissolved in each other.

13. A developer container according to claim 12, wherein the sealing member is bonded to the opening of the container by thermocompression bonding.

14. A developer container according to claim 12, wherein the sealing member comprises an easy peel film which can be peeled in the seal interface.

15. A developer container according to claim 12, wherein a portion of the sealing member, which corresponds to the opening of the container, is half cut.

16. A process cartridge detachable from the body of an image forming apparatus, comprising at least an image holding member, and a developer container according to claim 1.

17. A process cartridge according to claim 16, further comprising:

a development device having a development frame bonded to the container with the sealing member held therebetween and a free end of the sealing member being projected from said development frame; and an end seal provided for sealing the container and the development frame at the end of the container or the development frame on the side where the free end of the sealing member is projected.

18. A method of sealing a developer container comprising the steps of:

sealing an opening of a container for containing a developer with a sealing member, wherein a sealant main component of the sealing member is a low-molecular-weight polyolefin polymer synthesized by using a metallocene catalyst, wherein the sealing member comprises a sealant layer containing a dispersed material dispersed therein, wherein the container comprises a seal receiving surface and a seal area, wherein a material compatible with the dispersed material dispersedly contained in the sealant layer of the sealing member is dispersedly contained in at least the seal area of the container; and bonding the sealing member to the seal receiving surface of the container without direct contact with the seal receiving surface of the container.

19. A method of sealing a developer container according to claim 18, wherein the seal receiving surface is provided on the inside of the periphery of the container, and the section of the inner periphery of the container has a substantially semicircular form corresponding to the agitation rotation orbit of a developer.

20. A developer sealing member for sealing an opening of a developer container for containing a developer, said sealing member comprising:

a sealant main component composed of a low-molecular-weight polyolefin polymer synthesized by using a metallocene catalyst, wherein a gel-permeation-chromatography, molecular-weight distribution of said low-molecular-weight polyolefin polymer has no low-molecular weight component in a molecular weight range of $1\times10^3$ or less; and a sealant layer, wherein a thermoplastic elastomer is dispersedly contained in said sealant layer.

21. A developer sealant according to claim 20, wherein the low-molecular-weight polyolefin polymer is a linear low-density polyethylene or copolymer thereof, and a linear low-density polyethylene component is contained in an amount of 50 to 99% by weight based on the total amount of the sealant main component.

22. A developer sealing member according to claim 20, wherein the low-molecular-weight polyolefin polymer shows a molecular weight distribution in gel permeation chromatography, which has a molecular weight dispersion of 1 to 3 and a peak in the region of $1\times10^4$ to $1\times10^6$.

23. A developer sealing member according to claim 20, wherein the sealant layer contains 0.5 to 30 wt % thermoplastic elastomer.

24. A developer sealing member for sealing an opening of a developer container for containing a developer, said sealing member comprising:

a sealant main component composed of a low-molecular-weight polyolefin polymer synthesized by using a metallocene catalyst, wherein a gel-permeation-chromatography, molecular-weight distribution of said low-molecular-weight polyolefin polymer has a molecular weight dispersion of 1 to 3; and a sealant layer, wherein a thermoplastic elastomer is dispersedly contained in said sealant layer.

25. A developer sealing member for sealing an opening of a developer container for containing a developer, said sealing member comprising:

a sealant main component composed of a low-molecular-weight polyolefin polymer synthesized by using a metallocene catalyst, wherein a gel-permeation-chromatography, molecular-weight distribution of said low-molecular-weight polyolefin polymer has a peak in the region of $1\times10^4$ to $1\times10^6$; and a sealant layer, wherein a thermoplastic elastomer is dispersedly contained in said sealant layer.

* * * * *

UNITED STATES PATENT AND TRADEMARK OFFICE

CERTIFICATE OF CORRECTION

PATENT NO. : 6,157,796
DATED : December 5, 2000
INVENTOR(S) : Yasuo Fujiwara

It is certified that error appears in the above-identified patent and that said Letters Patent is hereby corrected as shown below:

Column 2,
Line 7, "a" should read -- of a --.

Column 10,
Line 56, "fame" should read -- frame --.

Column 17,
Line 34, "sealant" should read -- sealing member --.

Signed and Sealed this

Thirteenth Day of November, 2001

*Attest:*

Nicholas P. Godici

NICHOLAS P. GODICI
*Acting Director of the United States Patent and Trademark Office*

*Attesting Officer*